7/1/86 OR H 000,081

United States Statutory Invention Registration [19]

[11] Reg. Number: H81

[45] Published: Jul. 1, 1986

Szabo et al.

[54] PROJECTILE GUIDANCE RECORDING SYSTEM

[75] Inventors: Louis R. Szabo, Landing; William I. Osborne, Morris Plains, both of N.J.

[73] Assignee: The United States of America as represented by the Secretary of the Army, Washington, D.C.

[21] Appl. No.: 653,263

[22] Filed: Sep. 24, 1984

[51] Int. Cl.[4] ..... G01D 9/00; G01L 5/14

[52] U.S. Cl. ..... 346/38; 73/167

*Primary Examiner*—Nelson Moskowitz

*Attorney, Agent, or Firm*—Anthony T. Lane; Harold H. Card, Jr.; Michael C. Sachs

[57] ABSTRACT

An instrument package (or telemeter) designed to be carried by a projectile during test flights thereof and to process and record performance and/or meterorological data during such flights. The data is obtained from a plurality of on-board sensors and after signal conditioning the sensor outputs are sequentially sampled and the samples digitized before storage in memory. The stored data may be easily recovered after the projectile impacts by means of a portable interrogator unit. The package is designed to withstand the shock of the projectile's firing, flight, and impact.

8 Claims, 8 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

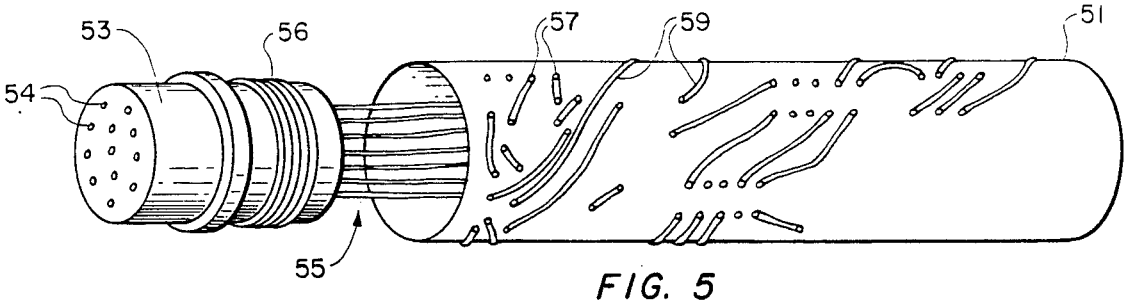
FIG. 5
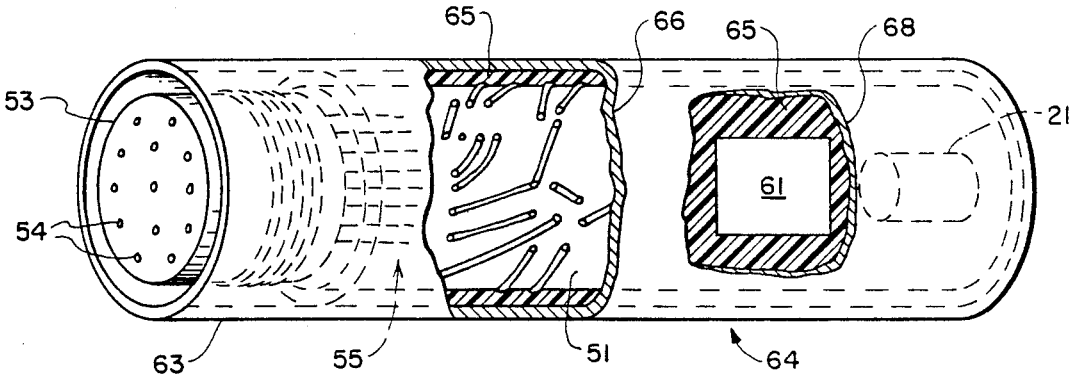
FIG. 6
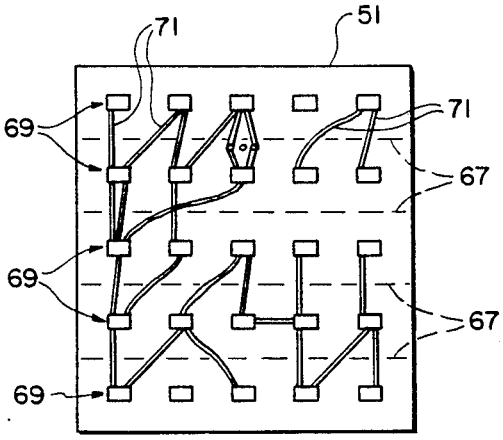
FIG. 7
FIG. 8
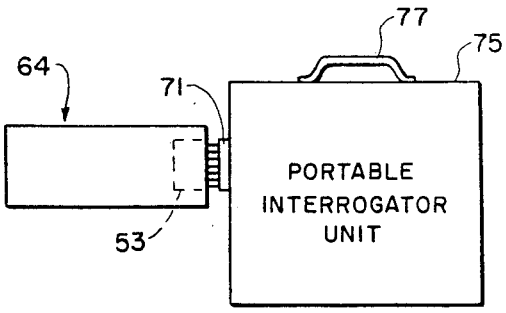

PROJECTILE GUIDANCE RECORDING SYSTEM

The invention described herein may be manufactured, used and licensed by or for the Government for governmental purposes without the payment to use of any royalties thereon.

BACKGROUND OF THE INVENTION

This invention relates to telemetry systems and more particularly to such systems which can be used to gather in-flight data on the performance of weapons such as guided missiles, artillery shells, "smart bombs" and other similar projectiles. Samples of such projectiles are often withdrawn from service and subjected to flight tests to evaluate the performance of such things as fuzes, arming circuits, guidance systems, or to measure trajectory. Also, during development of weapons of these types, test firings are made to evaluate performance by measuring such things as rate of rotation, vibration, stress, and other features. Also, environmental data such as meteorological data is often gathered during such flight tests. The recent introduction of sophisticated weapons such as "smart bombs" and projectiles has lead to an increase in the amount of on-board sensor data which must be gathered during such test flights.

Prior to the present invention there were two principal methods of gathering such in-flight data. One was a hardwired telemetry system in which data was transmitted by wires from the projectile as it was being launched or fired. The wires would be severed before the projectile left the gun barrel and no further data could be obtained thereafter. This method has obvious disadvantages and limitations.

The more common prior art practice was to transmit the in-flight data to a ground station by radio. This is known as RF telemetry. However, RF telemetry has numerous disadvantages, for example it requires a transmitter with numerous subcarrier oscillators for transmitting the outputs of each sensor. Also, the bandwidth of the transmitter limits the amount of data which can be transmitted. Thus, high frequency vibrational data which exceeds the transmitter's bandwidth cannot be telemetered by this means. Also, the projectile must be modified to include the transmitting antenna. RF telemetry also requires complex and expensive manned ground station equipment for receiving and recording the transmitted data. Also, the transmission of the data means that unauthorized parties can intercept it.

The present invention comprises a telemeter system which is designed to be temporarily installed in the projectile under test and which includes circuitry for processing and recording, in a digital memory, all of the data from the sensors carried by the projectile. The development of very large-scale integrated memory chips which have large storage capacity and which also can easily be made shock and vibration resistant has made feasible the in-flight recording of data on projectiles of these types. After the flight, the projectile is recovered and the instrument package therein is interrogated and the data stored in the telemeter's memory is transferred to a light-weight portable recording instrument. The memory telemeter can be packaged in a case which includes all of the required circuitry and a battery and which is designed to withstand and function during the highshock conditions of firing, flight, and target or ground impact. This memory telemeter is simpler, less expensive, lighter in weight and more accurate than the RF telemeters described above.

Such a memory telemetry system is especially useful in artillery projectile instrumentation. It is a self-contained, shock resistant, light-weight package, usually a cylinder, which may be located in any part of the projectile. Required shell modifications are minimal and the aerodynamic characteristics of the round are virtually unaltered. As a practical matter, the warhead of an explosive shell or missile will be removed for the test and the instrument package of the present invention inserted in its place.

SUMMARY OF THE INVENTION

The invention comprises an instrument package, or a digital memory telemeter, designed to be carried by a projectile as it is test fired, said telemeter comprising means to receive data from a plurality of sensors carried by the projectile under test and means to sequentially sample the outputs of said sensors and further means to digitize said sampled outputs of said sensors and to store in a solid state digital memory such digitized data. This digitization may involve converting analog voltage levels from the sensors to binary coded numbers which can be stored in memory.

The invention also comprises an instrument package comprising a case which preferably in the shape of a cylinder with a flexible circuit board rolled up and inserted inside of said cylinder, with a battery and one or more sensors located inside of said rolled circuit board. The package may be filled with a suitable potting compound which fills up all of the empty space inside of the cylinder, with an electrical connector at one end of the cylinder, to facilitate connection to external sensors and the reading out of the data in memory after the projectile has been recovered. Individual components mounted on the circuit board are hardened for shock resistance.

The invention also comprises novel circuitry for processing and storing in-flight data from a plurality of on-board sensors. Such circuitry may comprise, for example, signal conditioning circuitry, on-board processing circuitry, a multiplexer for sequentially sampling the outputs of said plurality of sensors, an analog-to-digital converter for converting said sampled outputs to digital form suitable for storage in a digital memory of the type used in computers, as well as control circuitry such as an arming circuit and an electronic switch.

It is thus an object of the invention to provide improved apparatus for obtaining in-flight sensor data from sensors mounted on projectiles of the type described.

Another object is to provide a novel shock resistant, light-weight, compact, inexpensive instrument package which can be easily mounted in a projectile to record in a digital memory the outputs of a plurality of on-board sensors which are arranged to sense the performance of said projectile.

A still further object of the invention is to provide an improved telemetry system for projectiles which does not require a transmitter, subcarrier oscillators, an antenna, or complex and expensive manned ground station equipment.

These and other objects and advantages of the invention will become apparent from the following detailed description and the drawings.

BRIEF DESCRIPTION OF THE DRAWINGS

FIG. 5 shows the rolled flexible circuit board on which the circuitry of FIG. 1 may be mounted, before it is inserted into its cylindrical case.

FIG. 6 shows the complete instrument package mounted in its case.

FIG. 7 is a plan view of the circuit board before it is rolled up.

FIG. 8 shows the portable recording unit which is used to recover the data after impact.

DETAILED DESCRIPTION OF A PREFERRED EMBODIMENT

The cost of firing test rounds of sophisticated projectiles is rapidly increasing, as well as the amount of data required for later evaluation of projectile performance. Thus, there is a need for development of a telemetry system which can obtain as much data as possible from each test firing at a minimal cost per unit of data, utilizing a compact and lightweight instrument package. The present invention provides such a system. In order to handle additional data with the apparatus of the present invention one may stack the memory chips or ICs to provide almost any desired memory capacity. Thus, large numbers of sensors can be accommodated, or high frequency, wide bandwidth information from a smaller number of sensors can be rapidly scanned or sampled and the resultant large number of data samples stored in the memory for recovery after the projectile has impacted. Subsequent ground processing of the recovered data samples can result in a synthesis of the original analog waveform which actuated the sensor.

Figure 1:
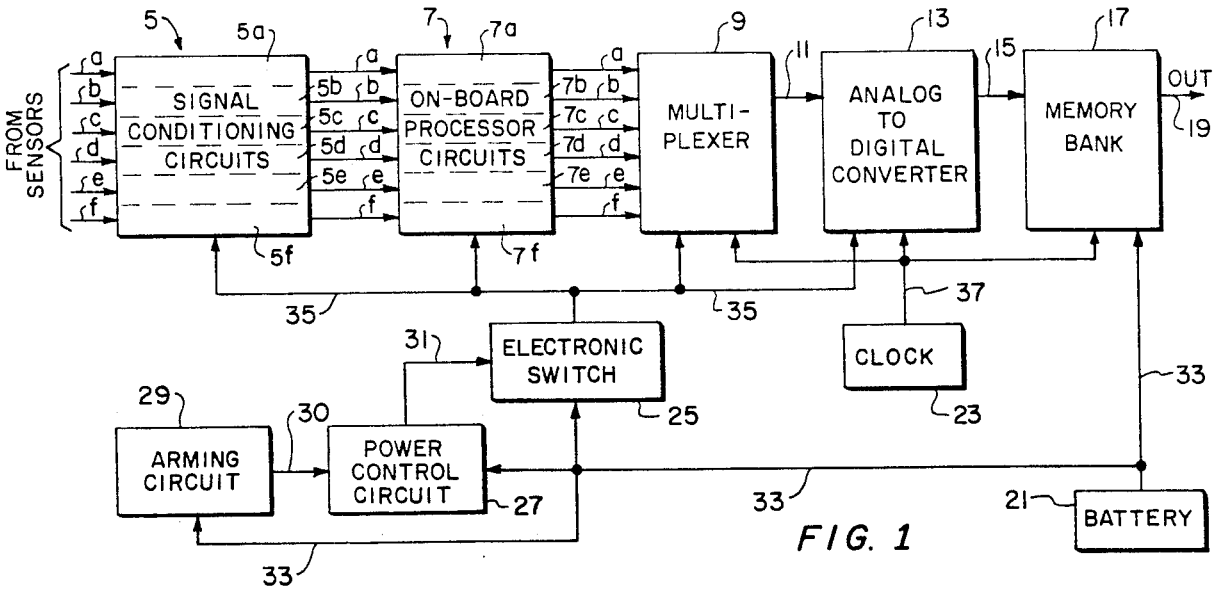
FIG. 1 is a block diagram of illustrative circuitry which may comprise the present digital memory telemeter.
Figure 2:
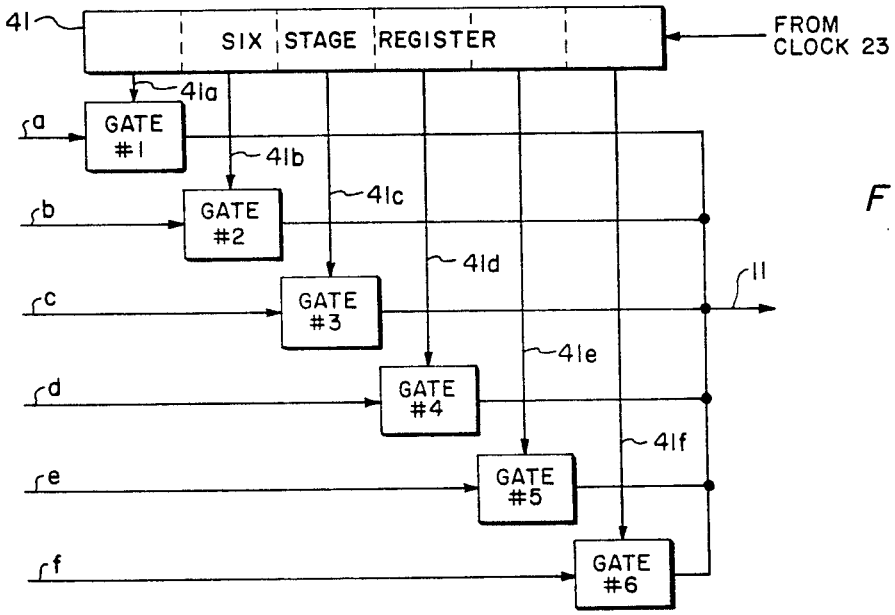
FIG. 2 is a block diagram showing more detail of the multiplexer of FIG. 1.
Figure 3:
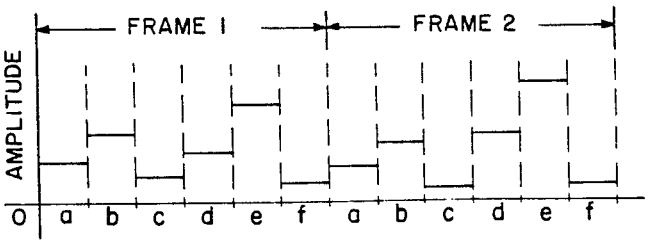
FIG. 3 illustrates the output of the multiplexer of FIG. 2.

The instrument package of the present invention may be included in such a package or telemeter as shown in FIGS. 1 and 2. In FIG. 1, six leads, *a–f*, are shown coming from an equal number of sensors which are all located at various places on the projectile. Some of these sensors may be within the instrument package case and others may be externally located. Each of the six leads, *a–f*, is applied to the signal conditioning circuits 5, which comprises separate channels, 5*a*–5*f*, for each of the connected sensors. The signal conditioning circuitry is conventional and performs such functions as filtering, amplification, and attenuation of the analog signals received from the connected sensors. The on-board processing circuits 7 are optional and can be used to process the sensor output signals in its six separate channels, 7*a*–7*f*. For example, circuits 7 may be designed to eliminate unwanted or redundant data which would occupy needed memory capacity. This processing circuitry for example might comprise threshold circuits for eliminating signals below or above threshold amplitudes. If desired, the processing circuitry 7 can be integrated with the signal conditioning circuits 5. The six analog sensor signals or voltages, *a–f*, at the output of the processor circuits 7 are applied to multiplexer 9, which is a device for sequentially sampling the voltage on each of its input leads *a–f* and producing a single waveform which varies in stepwise fashion according to the instantaneous values of the sensor signals as they are sampled. FIG. 2 shows in more detail how this can be accomplished by means of a plurality of transmission gates, labelled gate #1 through gate #6, each of which receives a different one of the sensor output voltages from leads *a–f*. A six stage register 41 has six outputs 41*a*–41*f*, only one of which will have a binary one or a voltage at its output at any one time, and the register 41 is connected to and stepped by clock 23. Thus the gates will be sequentially enabled by the signals on leads 41*a*–41*f* to sequentially sample the sensor outputs. The outputs of all the gates are tied together to form the output lead 11. The signal on lead 11 may appear as shown in FIG. 3 for two frames (or two cycles) of operation of the multiplexer. The voltage levels *a–f* therein represent the sensor voltages when that sensor's gate is enabled, thus applying the sensor voltage from one of the multiplexer input leads *a–f* to output lead 11. It can be seen that the voltage levels of FIG. 3 for the second frame are somewhat different from those of the first frame, caused by the changing of the sensor output between the sampling times of the two frames. The frame rate would be related to the bandwidth or highest frequency component in the sensor output, according to well known principles.

Figure 4:
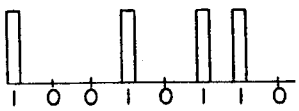
FIG. 4 shows the output of the analog-to-digital converter of FIG. 1.

The analog-to-digital converter 13 converts each one of the sample voltage levels on lead 11 to a binary digital number representing the sampled voltage level. For example, an 8 bit analog-to-digital converter would be capable of discriminating 256 different voltage levels and converting them to digital form. Such an 8 bit binary digital number is represented in FIG. 4. This number is 10010110 or 150 in decimal notation. Such a binary digital number is in proper form for storage in a digital memory such as memory blank 17, which is connected to the output of converter 13 via lead 15, and has output lead 19 for facilitating the reading out of the data in the memory. The term memory bank is used to indicate that it may comprise a number of stacked memory chips or ICs to achieve the required memory capacity. For example, in a prototype telemeter constructed by the present inventors, the digital memory bank 17 comprised one or more low power, static random-access memory (RAM) ICs, each with a 64 kilobit capacity. Future availability of higher capacity memories will result in higher storage capacity of this instrument, or the same storage capacity for fewer components.

Static RAMs of the type preferred in the memory bank of this telemeter system require no re-cycling to preserve the information therein. This simplifies the circuitry, however the power supply must be continually connected to the memory for data preservation, but the current drain is minimal. To this end, the battery 21 within the instrument package is continually connected to the memory bank via lead 33. The battery lead 33 is also connected to an electronic switch 25, power control circuit 27, and arming circuit 29. The arming circuit 29 has its output connected to power control circuit 27 via lead 30. The arming circuit controls the application of battery power to the signal conditioning circuits 5, to the on-board processing circuits 7, the multiplexer 9 and to analog-to-digital converter 13 via the power control circuit 27 and the electronic switch 25. The arming circuit may, for example, include an accelerometer for sensing the set-back acceleration caused by the firing of an artillery shell containing the instrument package, and applying a signal to power control circuit 27 in response thereto over lead 30. The power control circuit may then apply a signal over lead 31 to electronic switch 25 which will then close to apply battery power to the four aforementioned circuit elements connected thereto over lead 35. Thus, the setback acceleration initates the processing and recording of the sensor outputs. The power control circuit may include circuits such as a time delay circuit which may delay the operation of switch 25 for a predetermined time after projectile firing. It may also include a timing circuit which may, for example, open switch 25 after a time sufficient to complete the projectile's flight, thus saving battery power and also preventing the further storage of sensor data in memory after the projectile lands. The clock 23 has its output 37 connected to the multiplexer, the analog-to-digital converter and to the memory bank to synchronize and control the operation of these circuit elements.

The circuitry of FIG. 1 is preferably packaged in a cylindrical case such as is illustrated in FIG. 6. The maximum inside diameter of such an instrument package is 2 inches for most applications and this available space makes the use of rigid circuit boards impractical. Rigid boards in such a space would require the use of stacked discs with all the required interconnections between discs. Such an arrangement is difficult to build in a shock resistant form which is required for this invention. The most feasible circuit arrangement is to mount the discrete circuit components such as the memory chips or ICs comprising the circuit of FIG. 1 on a single flexible printed circuit board with the components arranged in parallel rows or columns so that the board can be rolled parallel to the direction of the component rows and inserted into the cylindrical case as a roll, with the components mounted on the inside of the rolled board. Flexible circuit boards can be rolled as much as 2 revolutions or 720° and fitted into a 2 inch diameter housing. This configuration leaves space inside of the rolled circuit board for the other discrete components such as the battery 21 and the arming circuit 29. The cylindrical case is provided with a plug or connector at one end thereof with a wire harness connecting the plug to the terminals on the rolled circuit board. The external sensors are connected to the telemeter's circuitry through the plug and the memory bank output is also connected thereto to facilitate the transfer of the data therein to the portable ground unit after the projectile has landed and been recovered.

The packaging of the digital memory telemeter must be done to avoid damage and to permit operation of the circuitry during the normal high acceleration caused by firing, flight, and projectile impact. This involves a knowledge of a shock spectrum including the duration, magnitude and the orientation of shock and acceleration forces. For example, the battery is perhaps the highest density item in the package and hence it should be placed near the bottom of the cylindrical instrument case which is located toward the aft end of the projectile. Also, the acceleration forces may displace the battery electrolyte, which can be minimized, for example, by locating the battery close to the center of rotation of the projectile. Thus, the instrument package should be located along the projectile's centerline with the battery centrally located at the aft end of the case, as illustrated in FIG. 6. Further, some capacitors with ceramic dielectrics can change value or capacity drastically if they are not properly aligned with the set back force vector. Further, most of the integrated circuits to be mounted on the circuit board must have their wires or terminals hardened to prevent breakage caused by the shock of firing and flight. High-g hardening involves totally encapsulating the area around the die of the component with a suitable potting compound. The compound must have the same coefficient of thermal expansion as the ceramic material of the IC itself to prevent wire or terminal breakage from differential expansion or contraction of the compound and the ceramic material. A second method which has been used is to employ a thin parylene conformal coating. The principal benefit of using parylene is that it greatly increases the strength of wire and lead bonds, face bonded chips, and conductor bridges. In addition, it exhibits good thermal stability, has high dielectric characteristics and acts to immobilize loose solder and wire particles which may have been left over from manufacture.

Another way that components with high natural vibrational frequencies can be protected is to mechanically decouple them from the metal telemeter case in order to attenuate the excitation forces and thus prevent destructive oscillations from occurring. This can be done, for example, by means of shock absorbing brackets on which the components are mounted or by the use of pads of flexible epoxy to cushion the components.

FIG. 7 shows a plan view of a flexible circuit board 51 before it is rolled for insertion into the cylindrical case 63 of FIG. 6. The circuit components are lined up in five horizontal rows 69 of five components each. The areas midway between these rows of components, indicated by the dashed lines 67, can be flexed or bent as the flexible board is rolled up from top to bottom, or vice versa, as viewed in FIG. 7. These dashed line areas will contain numerous circuit board conductors, such as 71, crossing them, however these thin flat conductors can withstand considerable flexing and bending without damage. The board is rolled with the components on the inside thereof so that the outside of the roll is substantially smooth so that it can easily slide into the case, and so that connections to the plug 53 are facilitated. The assembled telemeter system will have the aforementioned rows of components extending parallel to the cylinder axis.

FIG. 5 shows the rolled circuit board 51 with a connector or plug 53 at one end thereof and connected to the circuitry of the board by means of wire harness 55. The circuit board conductors such as 59 interconnect the circuit board terminals such as 57. The circuit board components are not visible in FIG. 5 since they are mounted on the inside of the rolled board.

The terminals or contacts 54 of plug 53 are connected to all of the externally located sensors, and also the output lead 19 of the memory bank 17 is also connected thereto to facilitate the transfer of the data after the telemeter lands and is recovered. The plug 53 has a threaded portion 56 which engages mating threads on the inside of the case 53, as shown in FIG. 6.

The completely assembled instrument package of the present invention is shown in FIG. 6 with two broken away portions 66 and 68 to show some of the internal details. As stated above, the battery 21 may be centrally located inside the rolled circuit board and in the aft end of the case 63 so that the weight thereof will not press on any other components during the high set-back acceleration during firing. The component 61 inside of the rolled board may be part of the arming circuit 29 of FIG. 1. This circuit will normally include an accelerometer to respond to the set-back acceleration and initiate the operation of the circuitry, as explained above, and the component 61 may be the accelerometer. A broken away section of the cylindrical metal case 63 is indicated by numeral 66, and shows the outside of the rolled circuit board which is also shown in FIG. 5, with the potting compound 65 between the circuit board and the inner surface of the cylinder 63. This potting compound may be poured into the cylinder after all the components are installed therein except for the connector or plug 53. The compound will fill all the empty space within the casing, both inside and outside of the rolled circuit board. The broken away section 68 shows both the casing 63 and the rolled circuit board broken away to illustrate the potting compound 65 inside of the roll and completely encapsulating the component 61. The casing 63 is preferably made of aluminum to reduce its weight.

Other shapes are possible for the metal casing, for example, it may be conical in shape if it is to fit into the nose of a projectile.

FIG. 8 shows how the data can be recovered from the instrument package 64 after impact and recovery thereof. The portable interrogator unit 75 has a handle 77 at the top thereof and a connector 71 on its side which mates with the connector 53 on the instrument package. The interrogator unit 75 has appropriate circuitry to interrogate the memory bank in the package and transfer the data therein to a self contained recorder such as a tape recorder or another bank of RAM chips or ICs.

While the invention has been described in connection with preferred embodiments, obvious variations therein will occur to those skilled in this art, in accordance with the scope of the appended claims.

What is claimed is:

1. A recording system adapted to be carried by a projectile during test flights and to gather data from sensors carried by said projectile, comprising; a plurality of sensors located on said projectile, circuit means to process and digitize the outputs of said sensors, and further circuit means to store said digitized sensor outputs in a solid state digital memory.

2. The system of claim 1 wherein said circuit means and said further circuit means comprise solid state components mounted on a flexible circuit board which is rolled and inserted into a hollow metal case, and wherein a battery and other discrete components are inserted inside of said rolled circuit board, and wherein shock absorbing potting compound is poured into said case after all of the said circuitry and components have been inserted therein.

3. The system of claim 2 wherein said solid state components are mounted in parallel rows on said flexible circuit board and said circuit board is rolled parallel to said rows.

4. An instrument package designed to be carried by a projectile during test flights thereof, said projectile comprising a plurality of on-board sensors, said instrument package comprising circuitry to process and record in a solid state digital memory the outputs of said plurality of on-board sensors, said circuitry being packaged to withstand the shock of the firing, the flight, and the impact of said projectile.

5. The instrument package of claim 4 wherein said circuitry comprises signal conditioning circuits connected to the said outputs of said sensors, a multiplexer connected to the outputs of said signal conditioning circuits, said multiplexer comprising means to sequentially sample the outputs of said sensors in the outputs of said signal conditioning circuits, an analog-to-digital converter connected to the output of said multiplexer, said converter comprising means to digitize the output of said multiplexer to produce binary digital signals for storage in a digital memory, a digital memory bank connected to the output of said analog to digital converter, said digital memory bank comprising means to receive and store the digitized sensor samples from said analog-to-digital converter.

6. The instrument package of claim 5 wherein said circuitry further comprises a battery, said battery being continually connected to said memory bank, said memory bank comprising one or more static random access memory chips or integrated circuits, and means for applying the output of said battery to the remainder of said circuitry through an electronic switch, said electronic switch being connected to and controlled by a power control circuit which is connected to and controlled by an arming circuit, and a clock connected to said signal conditioning circuits, to said multiplexer, to said analog-to-digital converter and to said memory bank.

7. The instrument package of claim 5 wherein said multiplexer comprises a plurality of transmission gates equal to the number of said sensors, and means to sequentially enable said gates to sequentially sample the voltage output of said sensors and apply the sampled voltage to a single output lead which is connected to said analog-to-digital converter.

8. The instrument package of claim 4 wherein said circuitry comprises a flexible circuit board with discrete solid state components mounted thereon in parallel rows, said circuit board being rolled parallel to said rows with said components on the inside of the rolled circuit board, said rolled circuit board being inserted into a case with further discrete components comprising a battery and an accelerometer located inside of said rolled circuit board, all of the empty space inside of said case being filled with a shock absorbing potting compound, and wherein all of said discrete solid state components are high-g hardened by having the dies thereof encapsulated with potting compound.

* * * * *